July 16, 1963  D. W. KELBEL ET AL  3,097,546
TRANSMISSION MECHANISM
Filed Aug. 29, 1960  2 Sheets-Sheet 1

Inventors
Donald W. Kelbel and
Kenneth M. Armantrout
By Ray E. Snyder Atty.

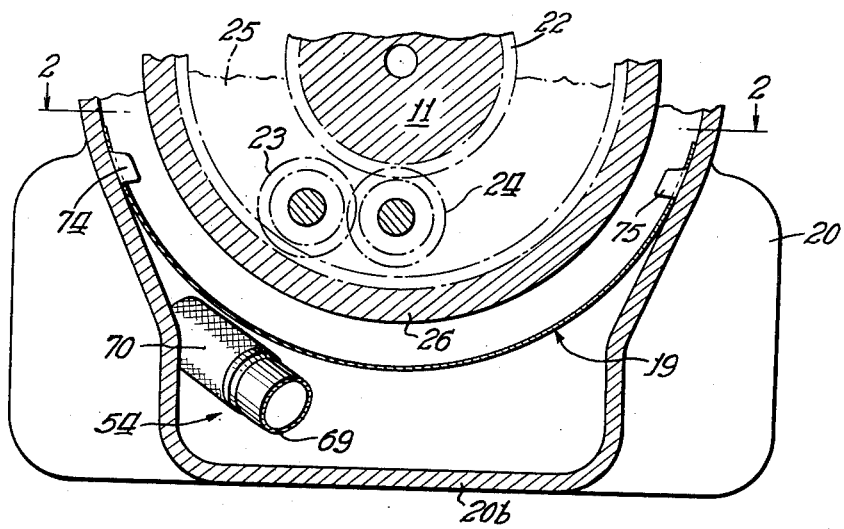
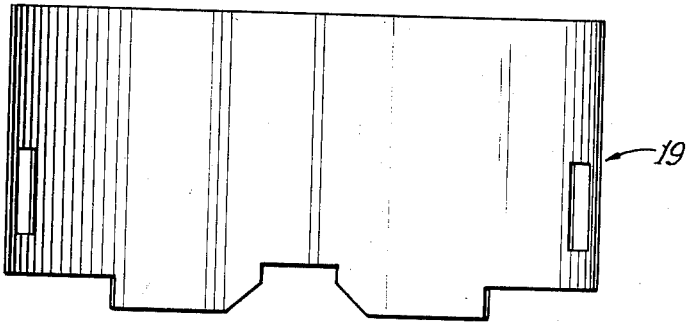
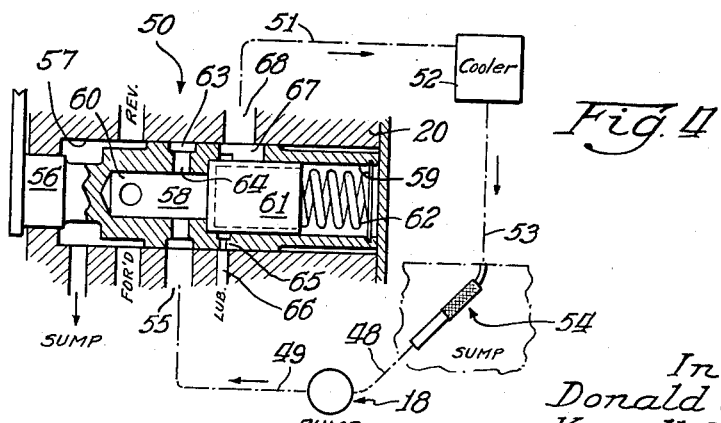

United States Patent Office 3,097,546
Patented July 16, 1963

3,097,546
TRANSMISSION MECHANISM
Donald W. Kelbel and Kenneth M. Armantrout, Muncie, Ind., assignors to Borg-Warner Corporation, Chicago, Ill., a corporation of Illinois
Filed Aug. 29, 1960, Ser. No. 52,453
2 Claims. (Cl. 74—738)

This invention relates to a hydraulic pressure actuated transmission mechanism, including hydraulic fluid circulating means therefor and is an improvement over the transmission in application Serial No. 738,099 of Samunel J. Woolley, now Patent No. 2,984,122.

This transmission is primarily intended for marine usage but is not limited to such use. Transmissions of this type normally have planetary gearing and brakes and clutches, hydraulically actuated servomotors for engaging the brakes and clutches for completing the power trains, and a fluid pump for supplying fluid pressure to the servomotors. In prior hydraulic marine transmissions, the sump on the bottom of the transmission has been substantially parallel with the axis of the drive and driven shafts of the transmission. When mounted in an inboard motorboat these transmissions are mounted with the driven shaft at an angle approximately 15° to 20° downward from the horizontal. When mounted in this position, the fluid level in the sump rises well above the rotatable parts in the transmission. Contact with the fluid when the parts are rotating creates a turbulence in the sump which causes foaming. When the fluid circulating pump picks up the foamy fluid, cavitation is produced in the pump which results in erratic pressure supplied to the servomotors and may result in slippage of the clutches or brakes.

Foaming is a function of fluid temperature and cavitation is more pronounced in marine transmissions than in automotive transmissions because marine transmissions are not exposed to air circulation and, therefore, normally operate at higher temperatures. Fluid coolers are used on most hydraulic marine transmissions to hold the operating temperature below some predetermined maximum. The pump delivers fluid to the cooler and the fluid is returned to the sump by gravity and pressure built up in the cooler. In prior transmissions, the return fluid is fed back into the sump above the fluid level where it may splash against the rotating parts and thereby add to the turbulence. The intake port of the fluid pump is desirably located at the lowest point of the sump so that only fluid, and not air, enters the pump. In a marine installation, particularly in a boat that may undergo high speed turns, the fluid in the sump may be thrown away from the pump intake port due to the bank angle and centrifugal force so that air enters and cavitation of the pump again may occur.

It is an object of the present invention to provide an improved transmission mechanism having means for circulating hydraulic fluid through the mechanism, and means for suppressing excess turbulence of the fluid circulated therethrough.

It is another object to provide a transmission mechanism having hydraulic fluid circulating means associated therewith including a pump for circulating the fluid, and a fluid ejector or return conduit, wherein the return conduit is connected directly to the input of the pump and is effective to limit fluid turbulence created by the fluid ejector and to provide a continuous supply of fluid to the pump.

It is still another object to provide a transmission mechanism including a housing defining a fluid sump in the bottom interior thereof, hydraulic fluid circulating means associated with the transmission including a fluid ejector or return conduit, and a baffle plate adapted to be disposed within said transmission housing and effective to suppress fluid turbulence created within said transmission housing by the return of fluid from the fluid ejector.

It is an additional object of the present invention to provide a hydraulically operated transmission mechanism comprising a housing which defines a fluid sump, planetary gearing rotatably mounted within the housing, and baffle means effective to separate the fluid contained within the sump from the planetary gearing.

It is still another object to provide a baffle plate made of unitary resilient sheet material and adapted to be stressed and inserted within a hydraulically operated transmission housing for separating certain rotating parts of the transmission from the hydraulic fluid contained within the housing.

The invention consists of the novel constructions, arrangements and devices to be hereinafter described and claimed for carrying out the above-stated objects and such other objects as will appear from the following description of a preferred form of the invention, illustrated with reference to the accompanying drawings, wherein:

FIG. 2 is a top view of the baffle plate taken on line 2—2 of FIG. 3;

FIG. 3 is a sectional view taken along line 3—3 of FIG. 1; and

FIG. 4 is a schematic view showing the path of circulation of fluid through the housing and fluid cooler.

Like characters of reference designate like parts in the several views.

Figure 1:
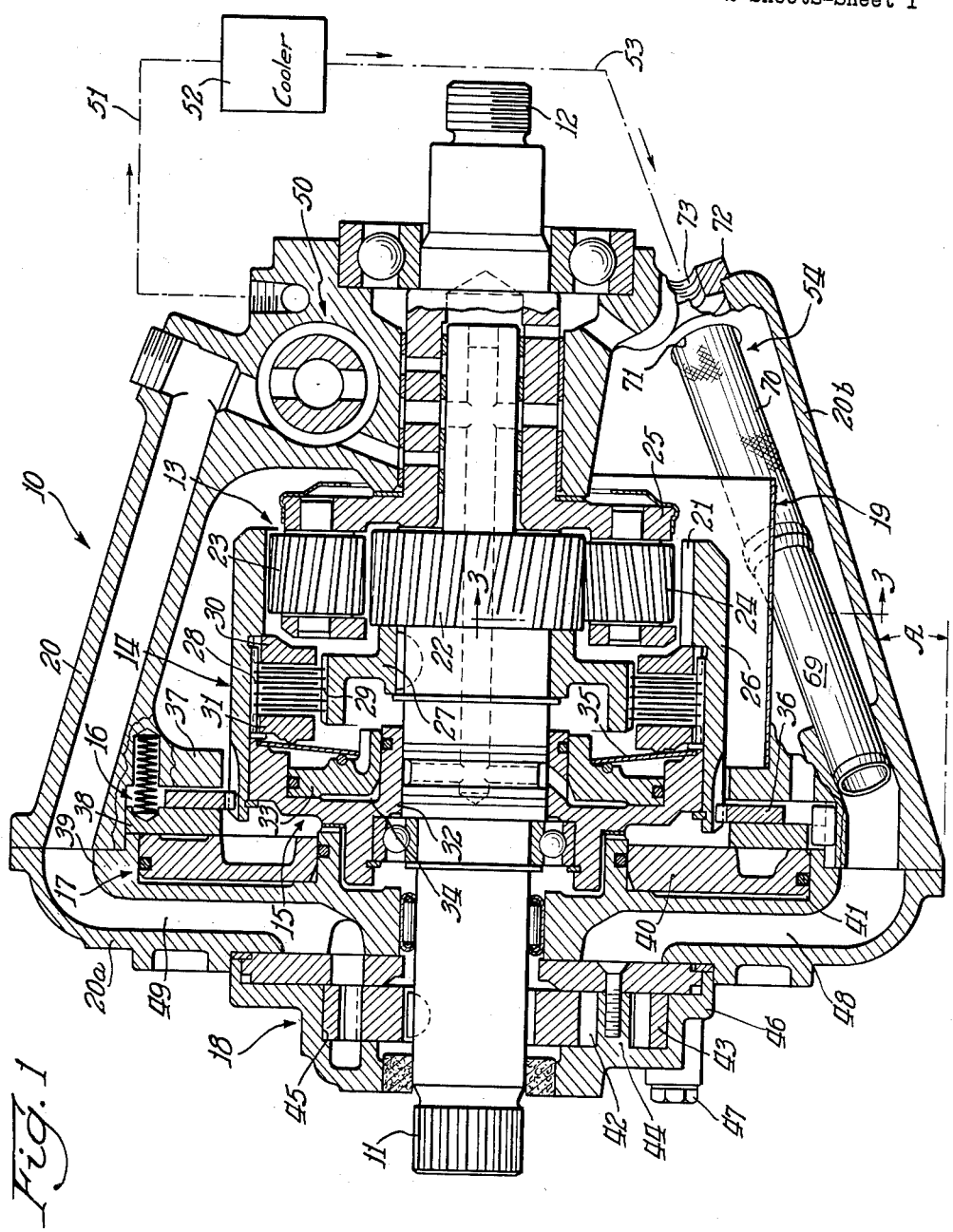
FIG. 1 is a longitudinal sectional view of the transmission mechanism of the present invention, including a baffle plate and fluid ejector disposed within the transmission housing.

Referring now to FIG. 1, a transmission mechanism 10 is shown which includes a drive shaft 11 and a driven shaft 12. The drive shaft 11 is connected to a driving engine through any suitable means (not shown), and the driven shaft 12 is connected to a propeller shaft through any suitable means (not shown).

The transmission unit 10 in general comprises a duplex planetary gear set 13, a multiple plate direct drive clutch 14, a hydraulic servomotor 15 for engaging the clutch 14, a reverse drive brake 16, a hydraulic servomotor 17 for engaging the brake 16, a fluid pump 18, and a baffle plate 19 disposed beneath the planetary gearing 13, all enclosed within a transmission housing 20 and 20a. The housing 20 also has a portion 20b which is inclined upward at an angle A of approximately 18°.

The duplex planetary gear set 13 comprises a ring gear 21, a sun gear 22 formed on an enlarged portion of the drive shaft 11, a plurality of planet gears 23 and 24, and a planet gear carrier 25. The planet gears 23 and 24 are in mesh with each other and are rotatably carried by the carrier 25. The planet gears 23 also are in mesh with the ring gear 21 and the planet gears 24 are in mesh with the sun gear 22. The ring gear 21 is formed in the interior of a drum 26, and the planet gear carrier 25 is formed integrally with the driven shaft 12 which is journaled within the housing 20. An extended end portion of the drive shaft 11 is piloted within one end of the driven shaft 12.

The direct drive clutch 14 comprises the outer drum 26, an inner drum 27 keyed to the drive shaft 11, a plurality of friction discs 28 splined within the outer drum 26 and a plurality of friction discs 29 splined to the inner drum 27 and interleaved with the discs 28. The friction discs 28 and 29 are sandwiched between an annular fixed end pressure plate 30 splined within the drum 26 and an axially movable annular pressure plate 31 slidably disposed within the drum 26.

The hydraulic servomotor 15 comprises an annular casing 32 journaled on the drive shaft 11 and supporting the drum 26 and an annular piston 33 slidably disposed within an annular cavity 34 formed in the casing 32. A Belleville-type washer 35 is interposed between the piston 33 and the movable end pressure plate 31 of the clutch 14. The washer 35 is pivotally disposed with its outer periphery against the annular casing 32 and in contact with the piston 33 near its inner periphery. The washer 35 also is in contact with the movable pressure plate 31 of the clutch 14 at a point near its outer periphery so that the body of the washer can function as a lever in engaging the clutch 14.

The reverse drive brake 16 comprises a friction disc 36 splined on the exterior of the drum 26 which is sandwiched between a portion of the transmission housing 20 constituting a fixed end pressure plate 37 and an annular axially movable pressure plate 38.

The servomotor 17 for engaging the reverse drive brake 16 comprises an annular casing portion 39 formed in the housing 20 and an annular piston 40 slidably disposed within an annular cavity 41 formed in the casing portion 39. The piston 40 abuts directly against the movable pressure plate 38 of the brake 16 and is adapted to press the friction disc 36 into engagement with the fixed end pressure plate 37.

The fluid pump 18 comprises an inner gear 42 keyed to the drive shaft 11, an outer gear 43 in mesh with and eccentrically disposed with respect to the gear 42, and a crescent-shaped barrier member 44 fixedly disposed between the eccentric gears 42 and 43. The gears 42 and 43 are rotatably disposed within an annular cavity 45 formed in a casing portion 46 and the casing portion 46 is attached to the housing 20 by a plurality of machine screws 47.

The transmission mechanism 10 may have a neutral condition, a forward drive condition, and a reverse drive condition.

Neutral condition is obtained when both the clutch 14 and the brake 16 are disengaged. In this condition, driving torque from the engine drives the drive shaft 11 and the sun gear 22 of the gear set 13. There is no reaction member for the gear set 13 in this condition and the forward rotation of the sun gear 22 causes the planet gears 23 and 24 to rotate and drive the ring gear 21 freely in the forward direction. There is thus no driving torque supplied to the driven shaft 12.

Forward drive condition is obtained when the clutch 14 is engaged and the brake 16 is disengaged. The clutch 14 is engaged by supplying fluid under pressure to the servomotor 15 causing the piston 33 to move axially to the right, as shown in FIG. 1, and press the friction discs 28 and 29 into engagement. Engagement of the clutch 14 locks together the ring gear 21 and the sun gear 22 so that the gear set 13 thereafter is caused to rotate as a unit and drives the planet gear carrier 25 and the driven shaft 12 at a one-to-one speed ratio with respect to the drive shaft 11.

Reverse drive condition condition is obtained when the brake 16 is engaged and the clutch 14 is disengaged. The brake 16 is engaged by supplying fluid under pressure to the servomotor 17 so as to cause the piston 40 to move to the right, as shown in FIG. 1. The piston 40 acts against the pressure plate 38 which, in turn, presses the friction disc 36 into engagement with the end pressure plate 37. The engaged brake 16 functions to hold stationary the drum 26 and the ring gear 21 of the gear set 13. In this condition, the forwardly rotating drive shaft 11 and the sun gear 22 drive the planet gears 24 in a reverse direction. The reversely rotating planet gears 24 in turn drive the planet gears 23 in the forward direction. The stationary ring gear 21 in mesh with the planet gears 23 serves as a fixed reaction element and as the planet gears 23 rotate forwardly, they walk around the interior of the ring gear 21 carrying the planet gear carrier 25 in a reverse direction with respect to the drive shaft 11. The reversely rotating planet gear carrier 25 drives the driven shaft 12 in a reverse direction at the same speed as drive shaft 11.

The fluid circulating means, as best seen in FIG. 4, includes the pump 18, a pump inlet passage 48, a pump outlet passage 49, a fluid distribution valve 50, an oil cooler input line 51, an oil cooler 52, an oil cooler return line 53, and an oil ejector 54.

The fluid distribution valve 50, also best seen in FIG. 4, includes a pressure inlet passage 55, a rotary member 56 mounted in a bore 57 in housing 20. The rotary member 56 has an axial bore 58 therein. The bore has a first portion 59 of a given diameter and depth and a second portion 60 of a smaller diameter and greater depth. Mounted in the first bore is a piston 61 spring biased by spring 62 to close the entrance to the smaller bore. The rotary member has an annulus 63 circumferentially there around which aligns with passage 55. There is also a radial hole 64 drilled through the rotary member 56 which interconnects the second bore 60 and the annulus 63. The rotary valve also has a means cooperating with the second bore (not shown) for connecting the fluid pressure to the forward and reverse servos for actuating or exhausting the servos. The rotary member 56 also includes a small radially drilled hole 65 which interconnects the first bore 59 with a lubrication port 66 which supplies lubrication for the rotating parts in the transmission. The rotary member also has a larger hole 67 drilled radially therein which interconnects the first bore 59 with a pressure outlet passage 68.

The fluid ejector 54 includes a hollow tube 69 of one diameter and a cylindrical screen 70 affixed thereto. The fluid ejector is mounted in the inlet passage to the pump on one end and in a hole 71 in the housing 20 on the other end. The fluid ejector is retained in this position by a plug 72 threaded in the hole 71 and drilled at 73 to receive the oil cooler return 53.

The baffle 19 is a unitary resilient steel sheet which is curved with a larger radius than the curved sides and top portion of the housing 20 in order that it can be stressed and inserted into the housing and secured thereto by bosses 74 and 75 on the inner side walls of the housing 20.

*Operation*

When the driving engine is started the transmission would be in neutral condition because most units of this type have a neutral safety switch in connection with shift mechanism to prevent starting the engine while the transmission is in forward or reverse drive condition.

When the engine starts the pump starts pumping fluid to the distribution valve 50, the pump upon initial pumping action must pick up fluid from the sump because there is no fluid remaining in the oil cooler 52 which has drained back into the sump. The pump picks up fluid through the screen 70, tube 69 and pump inlet passage 48, thereby pressurizes pump outlet passage 49, 55, and bore 58. When pressure in bore 58 builds up to a predetermined point, piston 61 is forced to the right, as viewed in FIGURE 4, against the bias of spring 62 allowing fluid to flow into ports 65 and 67. Ports 65 and 67 are in communication with passages 66 and 68 in all of the shift positions of the rotary valve 50. Passage 66 is connected to the bearings and gearing of the transmission (by a means not shown) for lubricating the various parts of the transmission. Passage 68 is connected to the fluid cooler 52 and allows fluid to flow through the cooler which returns the fluid to the sump through line 53 and the fluid ejector 54 which, after the transmission is operating, feeds fluid directly to the intake port of the pump. When the transmission is operating, the pump can take fluid from the sump through the screen 70 as well as from the cooler. However, on high speed turns the cooler return can supply sufficient fluid to the pump to prevent cavitation.

Summary

We have provided a hydraulic transmission with an improved sump portion, an improved baffle separating the sump from the rotating parts of the transmission, and an improved fluid ejector for returning fluid into the sump, all of which collectively act to suppress turbulence of fluid in the sump, and thereby eliminate cavitation in the pump.

In particular, we have provided a transmission with a sump which is sloped upward from front to rear at an angle of approximately 18° relative to the axis of the drive and driven shafts, thereby providing a flat bottomed sump when the transmission is mounted in an operating position. A sump of this shape has two definite advantages; one, it allows the engine-transmission silhouette to be installed lower and further to the rear permitting a shorter drive shaft; and two, the fluid level of the sump does not rise as high into the rotating parts of the transmission and, therefore, reduces turbulence created by the rotating parts contacting the fluid.

The improved baffle is of resilient steel sheet and is attached to the inner sides of the transmission housing. The baffle is curved when installed and forms along with the top and sides of the housing a continuous cylindrical shell around the rotating parts. This baffle, therefore, prevents the fluid thrown from the rotating parts from going directly into the sump and from rushing around the top and side walls into the sump for thereby creating turbulence in the fluid. With the baffle in place, the fluid thrown from the rotating parts can rush around the continuous cylindrical wall but to get to the sump it has to drain off the rear end of the baffle, thus eliminating a major cause of turbulence of the fluid.

We have also provided the transmission with a fluid return conduit from the fluid cooler that is connected directly to the intake of the pump and which prevents turbulence caused by the return fluid being fed back into the rotating parts. The feeding of the fluid from the return conduit into the intake of the pump supplies solid fluid to the pump. At all times, the conduit, therefore, prevents cavitation of the pump due to entry of foam or air as might occur on extreme high speed turns.

It is to be understood that our invention is not to be limited to the specific construction and arrangements shown and described except only insofar as the appended claims may be so limited, as it will be understood to those skilled in the art that changes may be made without departing from the principles of the invention.

We claim:

1. In a marine transmission including a housing with a sump formed therein, the combination of a drive shaft, a driven shaft, a planetary gear set interconnecting said drive and driven shafts, clutch and brake means including servomotors for engaging said clutch and brake to establish forward and reverse drives through said gear set, a fluid supply means in communication with said sump including a fluid pump for actuating the servomotors, a fluid cooler connected to the fluid supply means and including a fluid return conduit, a fluid ejector connected to said fluid return conduit and directly to a fluid intake port on the pump to provide a direct supply of fluid to the pump from the cooler, said fluid ejector including a tubular screen portion in communication with said sump, and said tubular screen portion serving as an inlet for fluid to enter said fluid ejector from the sump and as a fluid conduit for fluid flow between the cooler and the pump.

2. In a marine transmission including a housing with a sump formed therein, the combination of a drive shaft, a driven shaft, a planetary gear set interconnecting said drive and driven shafts, clutch and brake means including servomotors for engaging said clutch and brake to establish forward and reverse drives through said gear set, a fluid supply means in communication with said sump including a fluid pump for actuating the servomotors, a fluid cooler connected to the fluid supply means and including a fluid return conduit, a fluid ejector connected to said fluid return conduit and directly to a fluid intake port on the pump to provide a direct supply of fluid to the pump from the cooler, said fluid ejector comprising an elongated tubular member and a tubular screen portion coextensive therewith said tubular screen portion being in fluid communication with said sump and serving as an inlet for fluid to enter said tubular member from the sump and as a fluid conduit between the cooler and the elongated tubular member.

References Cited in the file of this patent
UNITED STATES PATENTS

| | | |
|---|---|---|
| 2,325,931 | Avigdor | Apr. 3, 1943 |
| 2,595,969 | McFarland | May 6, 1952 |
| 2,877,668 | Kelbel | Feb. 19, 1957 |
| 2,800,083 | Tweedale et al. | July 23, 1957 |
| 2,943,575 | Pettibone | July 5, 1960 |
| 2,968,190 | Orr | Jan. 17, 1961 |
| 2,983,226 | Livermore | May 9, 1961 |